United States Patent [19]

Picolet et al.

[11] Patent Number: 6,021,139

[45] Date of Patent: Feb. 1, 2000

[54] MULTIPLEX SIGNAL DECODING

[75] Inventors: Randy D. Picolet, Burbank, Calif.; Simon Blanchard, Hurley, United Kingdom

[73] Assignee: U.S. Philips Corporation, New York, N.Y.

[21] Appl. No.: 08/728,239

[22] Filed: Oct. 8, 1996

Related U.S. Application Data

[63] Continuation-in-part of application No. 08/540,425, Oct. 10, 1995, abandoned.

[51] Int. Cl.[7] .................................. H04J 3/04; H04J 1/02
[52] U.S. Cl. ............................................ 370/535; 370/493
[58] Field of Search .................................... 370/486, 487, 370/473, 493, 498, 468, 522, 542, 543, 544, 477, 535, 536; 348/461; 386/98, 111, 112, 95, 125

[56] References Cited

U.S. PATENT DOCUMENTS

| | | | |
|---|---|---|---|
| 5,301,191 | 4/1994 | Otani | 370/468 |
| 5,367,522 | 11/1994 | Otani | 370/468 |
| 5,477,542 | 12/1995 | Takahara et al. | 370/473 |
| 5,481,543 | 1/1996 | Veltman | 370/473 |
| 5,483,534 | 1/1996 | Ohki et al. | 370/535 |
| 5,497,241 | 3/1996 | Ostrover et al. | |
| 5,835,487 | 11/1998 | Campanella | 370/316 |

*Primary Examiner*—Ajit Patel
*Assistant Examiner*—Ricardo M. Pizarro
*Attorney, Agent, or Firm*—Leroy Eason

[57] ABSTRACT

A signal processing method and apparatus are described for demultiplexing selected components (especially audio signals) from a multiplexed data stream. Each of the desired channel components has a unique identification code detected by a processor parsing the contents of a received data buffer between the disc reader and the demultiplexer. The demultiplexer is set up to output received data channel streams having a specific identification code different from any of those assigned to the channel streams originally. Prior to demultiplexing, the identification code for a desired one of the channel streams is altered by the processor to the specific identification code as it passes through the buffer in order to avoid re-setting the demultiplexer.

15 Claims, 5 Drawing Sheets

MULTIPLEX SIGNAL DECODING

This application is a Continuation-in-Part of Ser. No. 08/540,425 filed on Oct. 10, 1995, now abandoned.

BACKGROUND OF THE INVENTION

The present invention relates to a method and apparatus for decoding multiplexed data signals and particularly, but not exclusively, to switching between audio or data streams of a multiplexed signal.

One particular use for such multiplexed signals is to carry alternative sound tracks or subtitles for video sequences in compact disc or broadcast applications, where the sound tracks may be in different languages. An example of such a system, where a CD-ROM carries a number of different language subtitle tracks to accompany video segments or static images, is described in U.S. Pat. No. 5,497,241 (Ostrover et al/Time-Warner). During a "set-up" phase, control and presentation data for the CD-ROM is read from the lead-in track which control data causes generation of a menu of user options, including available language selections. In response to the user input a microprocessor master control sets a demultiplexer to pass the selected audio or subtitle streams from the stream of data read from the disc.

Such an arrangement is generally suitable for single continuous-play sessions, where a single subtitle language or other multiplexed data stream remains selected throughout operation. In interactive applications, however, changes may occur much more often, and the selection of the next video clip and a sound track to accompany it should ideally be made with the minimum intrusion to the user and generally be accomplished at high speed. Encoding techniques for video which control bit-allocation in order to allow joining of video image sequences "seamlessly" (without extensive delay and without decoder buffer overflow/underflow) are described in our pending U.S. patent application Ser. Nos. 08/565,697; 08/565,098 and 08/563,471.

Whilst audio streams do not generally suffer the buffer overflow/underflow problems associated with video, small discontinuities in the audio stream will generally be more noticeable to the user than a short discontinuity (i.e freeze-frame) in the video stream. Such discontinuities are likely to arise in systems such as that of U.S. Pat. No. 5,497,241 (described above) where the data is supplied in the form of a multiplexed signal containing a number of audio channels, due to the finite time taken by the conventional technique of using a system call to re-set the decoder such as to change from one audio channel of the multiplexed stream to another.

SUMMARY OF THE INVENTION

It is accordingly an object of the present invention to improve the speed of switching between the streams of a multiplexed signal and particularly, but not exclusively, for switching between audio streams.

In accordance with the present invention there is provided a signal processing apparatus operable to receive a data signal comprised of a multiplexed plurality of component streams each having a unique identification code as a part thereof, the apparatus including a demultiplexer operable to receive such a data signal from a signal source, together with an input identification code, to demultiplex the signal, and to output the component stream thereof whose identification code corresponds to the input identification code; characterised by patching means in line between the signal source and demultiplexer, the patching means being arranged to change the identification code of a selected component stream within the data signal to a further identification code, and the demultiplexer input identification code is said further identification code.

The patching means may suitably comprise a memory and coupled processor, the memory being arranged to receive the said data signal and said processor being arranged to parse the contents of the memory, identify the locations of the component stream identification codes, and overwrite a selected one of the component stream identification codes with the further identification code.

The signal source may comprise a removable storage device (such as an optical disc) with the apparatus further comprising suitable means for reading the data therefrom. In such an implementation, the storage device may hold data defining an identifier for that device, said means operable to access data being operable to read said device identifier, and said apparatus further comprising non-volatile storage means coupled to receive and store said device identifier with a list of component stream identifiers carried by said device. With such storage of component stream identification codes (identifiers), the non-volatile storage means may be arranged, when reading of data from said removable storage device is stopped, to store with said list of component stream identifiers an indication of the last selected component stream identifier. With such "last selection" storage, a user may be relieved of having to select a channel on subsequent accessing of a particular disc, with his last choice from the previous session acting as the default choice at the start of the next.

The data of the data stream may be encoded according to a predetermined coding scheme (such as MPEG) and, in such a situation, the apparatus may suitably further comprise a decoder stage arranged to receive and decode the component stream output by the demultiplexer. Alternatively, the data signal from the signal source may comprise groups of data packets, with each group comprising one data packet per component stream in a predetermined arrangement, and each packet including a packet header containing the respective identification code, and the patching means may suitably be arranged to identify packet headers for a selected component stream. In such an arrangement, and where all data packets contain a common number of bits, the patching means may suitably be arranged to identify packet headers by detecting the start of a group and then simply counting in multiples of the number of bits per packet to identify packet headers. In a further option, rather than receiving data from a removable storage device, the data signal may be transmitted from a remote location with the signal source comprising a receiver coupled with the signal processing apparatus and arranged to receive such transmissions.

Also in accordance with the present invention there is provided a signal processing method for separating a desired one of a plurality of multiplexed component streams from a data signal, wherein each component stream has a unique identification code as a part thereof and a demultiplexer separates the component streams of the data signal and outputs the stream having a predetermined identification code; characterised in that the demultiplexer is set up to output a data signal component stream having a further identification code and, prior to supply to the demultiplexer, the identification code of a selected component stream within the data signal is replaced by the further identification code.

As above, the method may include the further steps of maintaining a record of the latest component stream selection against data signal source identification; checking signal source identification against storage on newly establishing contact with a signal source and, where a record exists for said source, initially using said stored latest component stream selection as the selected component stream.

Further in accordance with the present invention, there is provided a removable storage device as defined in the attached claims to which reference should now be made.

As will recognised, by setting the demultiplexer for one particular identification code, and then modifying the input data stream such that the desired component has that particular identification code, re-setting the decoder for different identification codes is avoided and the speed of channel switching is greatly improved.

BRIEF DESCRIPTION OF THE DRAWINGS

Further features and advantages of the present invention will now become apparent from the following description of differing embodiments and uses of the invention, given by way of example only, with reference to the accompanying drawings in which.

DESCRIPTION OF THE PREFERRED EMBODIMENTS

The following description is in terms of compacted data streams, such as may be delivered over broadcast links or read from optical disc storage media, and principally such data streams having multiple audio or data channels which it is desired to quickly switch between. Multiplexed audio channel arrangements may be used to provide, for example, different language soundtracks accompanying a common video sequence. It will be recognised however, that the invention is not limited to audio data, whether conforming to particular coding standards such as MPEG (ISO 11172-3), and is also applicable to switching between multiple data streams, whether independent or associated with audio or video clips, for example for subtitling. The invention is also useable for switching between multiplexed video streams although only at well defined places where video buffer states in the streams are known to be the same, as will be understood by those skilled in the art. The feature common to all embodiments is that each of the multiplexed channel streams has either a unique identification code as a part of it, or is uniquely identified in a header to the multiplexed data.

Figure 1:
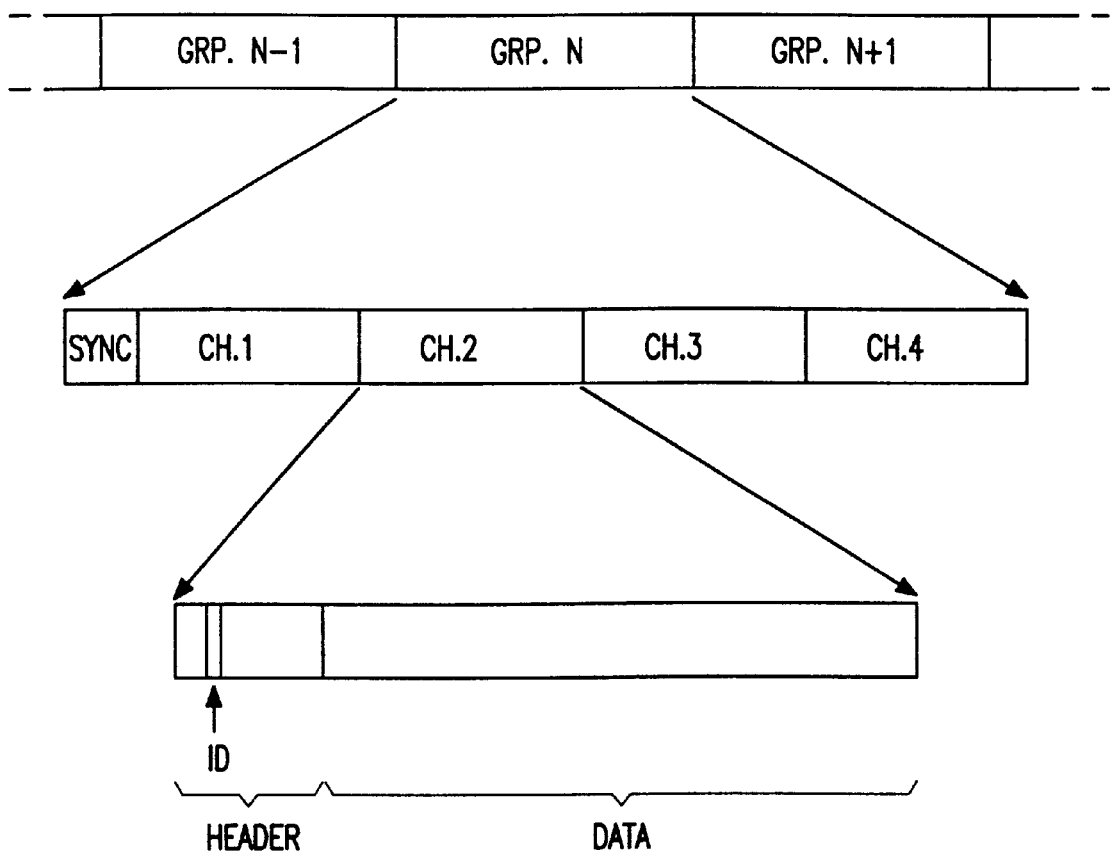
FIG. 1 represents an arrangement of audio data packets multiplexed in a data stream.

FIG. 1 schematically represents a first stream arrangement in which four audio channel signals are multiplexed together for transmission or storage. The data is transmitted in successive groups, each of which generally contains a number of synchronising bits SYNC followed by a respective packet (CH.1 to CH.4) for each of the audio channels. Note that different channel packets may contain differing amounts of data, with different length packets (subject to the constraints of a maximum group size) or packing may be used to maintain a common fixed packet length. As shown, each of the packets is made up of a header portion followed by a stream of audio data. Within the header portion is section carrying an identification code (ID) for the audio channel stream. On reception, a demultiplexer parses the group headers to determine which packet (if any) carries the appropriate ID: the packet with the ID for which the demultiplexer is set will then be forwarded for further processing whilst the remainder will be discarded.

Figure 2:
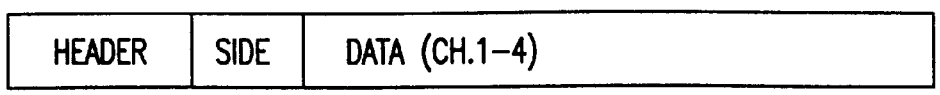
FIG. 2 represents an alternative audio data packet multiplexing arrangement.

FIG. 2 is an alternate arrangement of multiplexed data, this time according to MPEG standards. In this case, each of the "groups" (which are not constrained to a fixed length) comprises a single header, followed by a section for side information, and finally a main data stage within which the data for the four channels is multiplexed. The header begins with a synchronisation word followed by a number of bits having particular and distinct functions (such as indications of bit rate and sampling frequency) as will be well understood by those skilled in the art. The side information section identifies the subsequent sub-frames (the multiplexed channels) and the main data section contains scale factors and auxiliary data in addition to the coded sub-band samples. The advantage of this latter embodiment is that the demultiplexer has a single, readily identifiable, header to parse to find the identification codes as opposed to having to identify and then parse n separate headers per group of n multiplexed channels.

Figure 3:
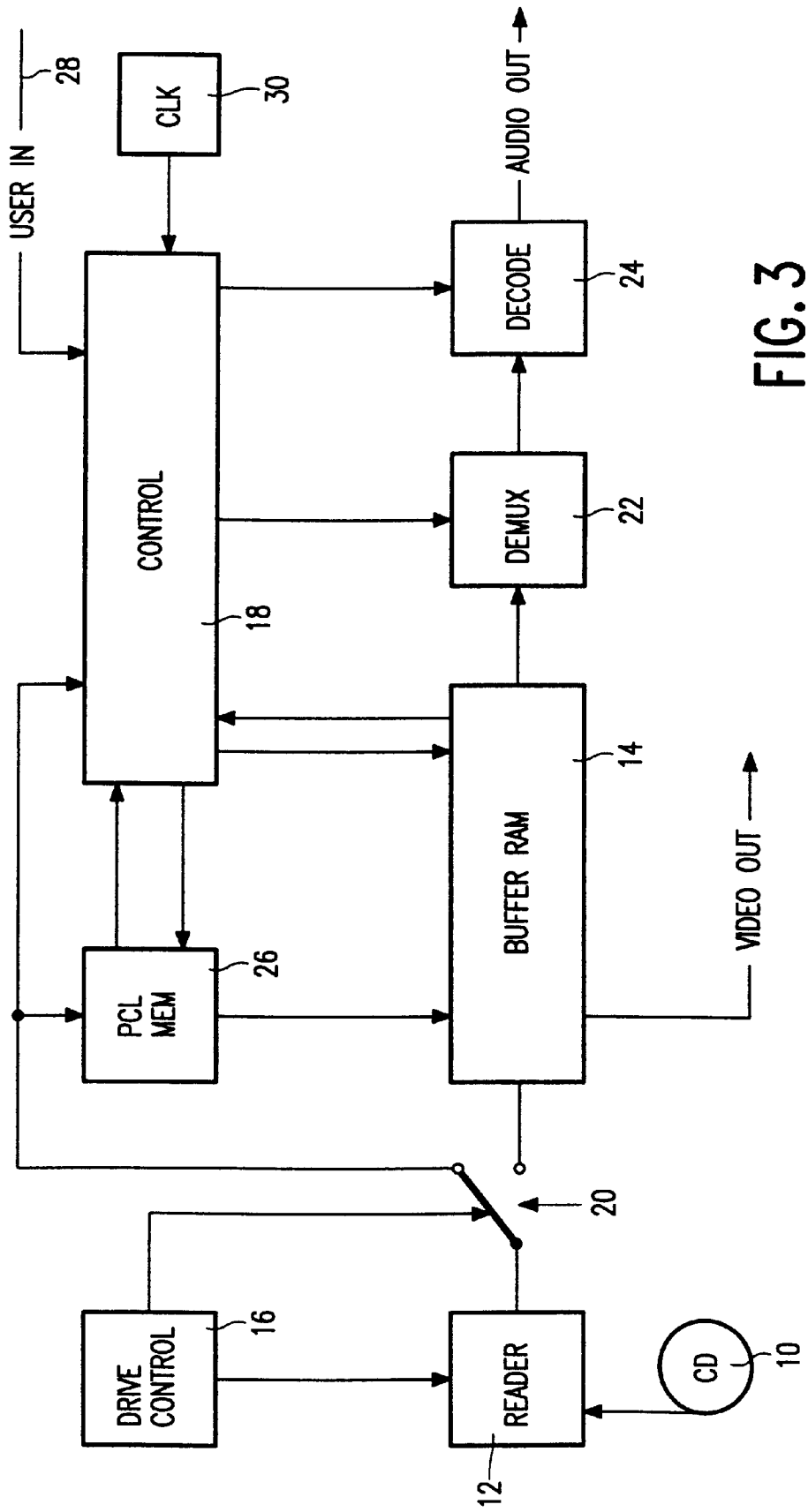
FIG. 3 is a block schematic diagram of a decoder stage in a programmable AV reproduction apparatus embodying the present invention.

FIG. 3 is a block diagram showing a decoder arrangement for use in a programmable AV reproduction unit, such as a CD-ROM or CD-i player. Such an arrangement is intended to receive encoded data in multiplexed form, as shown in FIG. 1 or FIG. 2. The data is carried on disc 10 accessed by a suitable reader 12 which outputs the data to a buffering random-access memory 14. Operation of the reader 12 is directed by a reader control stage 16 which handles the boot-up operation on loading of a disc, causing reading of the disc application program (provided on the first track of the disc together with other data to be described) to the main player programable controller 18. When the loading of the application program and delivery of the accompanying data files from the first track has been completed, the control stage 16 operates switch 20 to divert all subsequently read data from the disc to go to RAM 14. Where the disc carries a composite audio and video (AV) stream, the video component data is read out from RAM 14 for separate decoding and other treatments. The requirements for handling the video component will be familiar to those of ordinary skill in the art, have no bearing on the operation of the present invention, and will not be further described.

When a complete group (FIG. 1 arrangement) or group header (FIG. 2 arrangement) has been read into the buffer 14, a patching operation takes place (to be described) after which the group data is output to a demultiplexer 22 wherein a desired one of the four audio channels CH.1 to CH.4 is selected by parsing the or each header to identify the desired ID. The extracted channel stream is then output via a decoder stage 24, and the data for the remaining (non-selected) channel streams is discarded. A play control list (PCL) memory 26 is coupled to the main controller 18 and holds the additional data downloaded with the application program on boot-up or disc loading. The memory contents include a first PCL (a structure containing memory pointers to the contents of the buffer 14) which is required for the operation of the demultiplexer 22, as well as a table of channel stream IDs for the disc. This table of channel stream IDs suitably includes data specifying what each channel carries, such that an initial menu of options can be generated and presented to the user for selection during set up. The menu may be in the form of a sequence of displayed options presented on an alpha-numeric (e.g. dot-matrix) display of the player itself, or an on-screen menu supplied to a video monitor coupled to the player may be used.

In operation, the four audio channels CH.1 to CH.4 will typically have IDs 1, 2, 3 and 4 respectively, specified in the table downloaded to the PCL memory 26. Rather than the conventional operating technique of setting the demultiplexer 22 to output to the decoder 24 the audio channel stream having a specified one of the four identification codes and then subsequently re-setting the demultiplexer when a different one of the audio channels is required, the demultiplexer 22 is initialised during the boot-up operation to pass a channel stream having an identification code different from any of those specified in the table in memory 26 (for example identification code 0). With the determination of which audio channel is required, which may be achieved in a number of different ways (described below), the main controller 18 determines the stream ID required in the immediately following group. As this following group is read into the buffer 14, the controller 18 parses the or each header to locate the identification code for the audio channel required: having identified it the controller 18 overwrites this with the identification code for which the demultiplexer 22 is set (identification code 0). If the required identification code is not present in the following group, the currently selected channel ID will again be patched and the search for the new ID will be carried over to the subsequent group.

The determination of the desired audio channel is suitably in direct response to the user input, on line 28, following display of the menu of options. In the event that no user selection is made within a predetermined period, counted out by the controller 18 against the system clock 30, a default channel is selected. The default selection may simply be the lowest numbered channel (smallest ID), or one of the channels may be specifically identified as the default selection in the table loaded in memory 26. Alternatively, where the player includes non-volatile RAM, a record may be stored of the last selected channel against a disc identifier such that, at the start of a subsequent session, a simple check of the loaded discs identifier against stored records will produce the default channel selection if that disc had previously been loaded.

Figure 4:
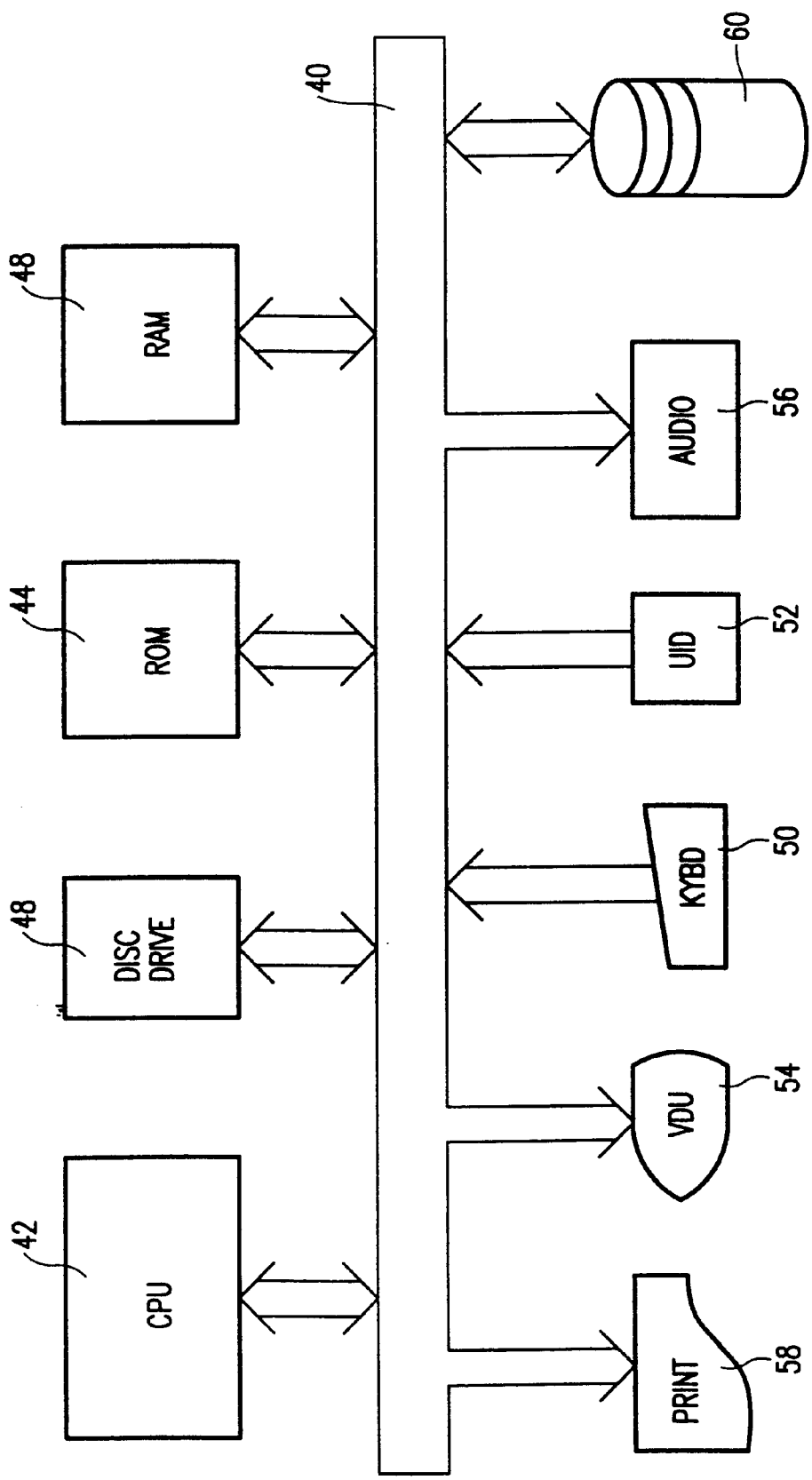
FIG. 4 schematically represents the employment of the present invention in a PC-based system.

It will be recognised that there is a trade off between the avoidance of system calls to reset the demultiplexer and the processing capability required to parse the headers and overwrite the identified ID. The required capability will generally already be available however, even in relatively low processor capacity systems such as CD-ROM or CD-i players, and the benefits add value in terms of faster switching between channels. As described above, the parsing is generally simplified where there is a single header, as in the FIG. 2 arrangement. In a special case however, faster and simpler handling may be obtained for the FIG. 1 arrangement if the audio packets making up a group are all of the same length, occur in the same order, and have the same arrangement of header such that the identification codes for the respective audio channel packets will occur a predetermined number of bits after the start of the group. In this case, the patching operation need only comprise identifying the start of a group and simply counting to determine when a received data bit or bits comprises a predetermined channel identification code to be overwritten.

Where there is greater processing power available, for example in a personal computer (PC) with associated disc reader, a more advanced form of the patching operation may be incorporated as a disc-reader utility held in non-volatile storage in the PC: FIG. 4 is a block schematic diagram showing operational components of a PC provided with such a disc-reader utility. Based around a central bus 40, the system comprises a CPU 42 provided with main storage in the form of ROM 44 and RAM 46, with the disc-reader utility held as part of the boot-up firmware in the ROM 44 to be called up on power-up of the system or on loading of a disc in disc drive 48. User input may be via a keyboard 50 or other user input device (UID 52) such as a mouse or tracker ball. In addition to a video display 54, output devices suitably include an audio reproduction stage 56 and optionally a printer 58. Additional off-line storage 60 may be provided in the form of a floppy disc read/write unit. The operation of these peripheral devices generally has no bearing on the operation of the disc reader utility (to be described), will be familiar to the person of ordinary skill in the art, and will not be further described.

Figure 5:
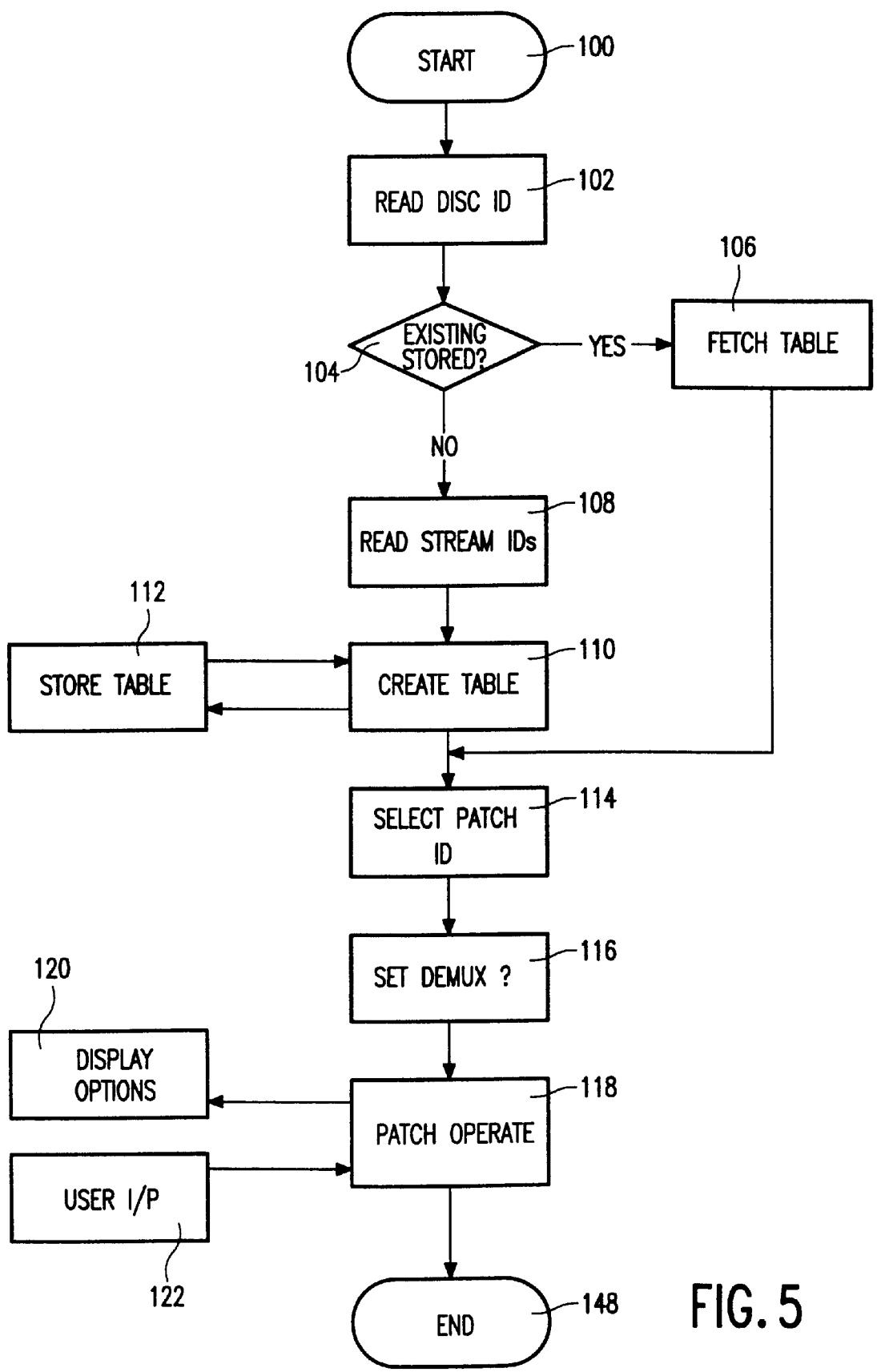
FIG. 5 is a flow chart representation operation of a disc-reading utility for the embodiment of FIG. 4.

FIG. 5 is a flowchart illustrating operation of the disc-reader utility for the PC-based embodiment. From a start condition 100 (suitably which ever is the later of powering up and disc loading), the disc title or identifier IDD is read from the set-up information in Track 1 of the loaded disc, at step 102. At step 104, a comparison is made of the current disc IDD and a table of identifiers held on hard disc (part of RAM 46) and for which a table of stream identifiers is already held: if there is a match then the stored table of stream identifiers is fetched (step 106) for subsequent use. If there is no pre-existing table of stream identifiers, the different ones are read from the disc (step 108) and a table is created for the disc (step 110). This table is then stored (step 112) on the hard disc and identified by the loaded disc identifier IDD.

Having created the table of stream identifiers at step 110, or accessed the appropriate existing table from storage at step 106, the patching identifier (the channel selection for which the multiplexer is set) is chosen at step 114 by reference to the table of disc stream identifiers such as to be different to any of the existing identifiers for that disc. For simplicity of selection, the patching identifier IDP is preferably always set to the same value such as IDP="0" unless that identifier is already in use on the disc. By continued use of a "preferred" patching identifier, the need to reset the demultiplexer (as at step 116) is reduced to only those situations where a newly-inserted disc uses the preferred patching identifier as a basic stream identifier.

Figure 6:
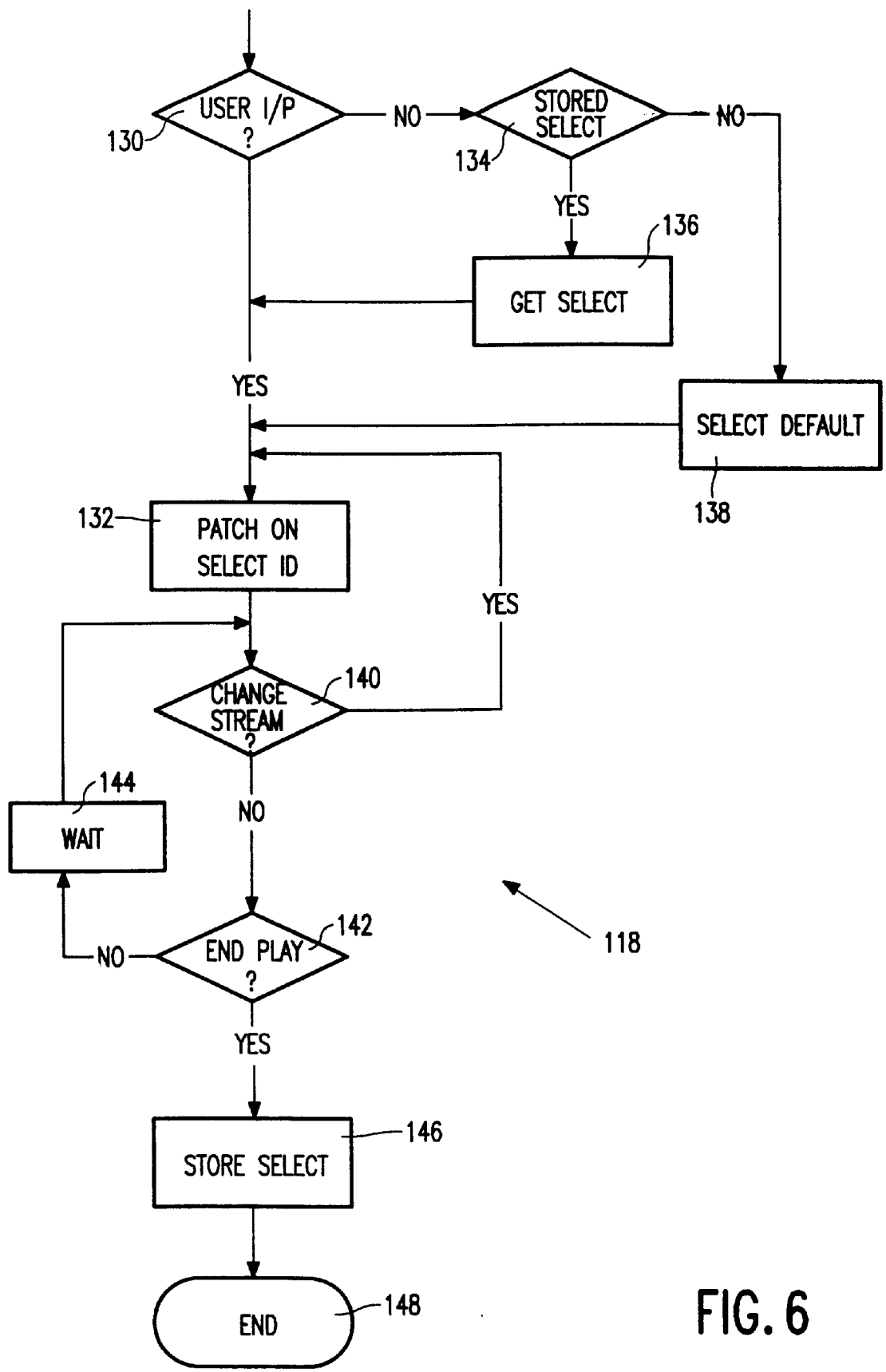
FIG. 6 illustrates in greater detail a part of the flow chart of FIG. 5.

With the demultiplexer set up to select the stream with the patching identifier, the patching operation may commence as illustrated generally at 116 in the Figure. With a menu of options available being presented to the user (at 120) the handling of stream selection changes during the patching operation of 118, in response to user input (at 122), is illustrated in greater detail by the flow chart of FIG. 6.

Initially, following loading of the disc, a check is made (step 130) for the presence of a user input stream selection. If such a selection is present, the patching operation goes ahead at step 132 with the identifier of the selected stream being overwritten by the patching identifier prior to demultiplexing. If, however, step 130 determines (suitably within a predetermined period as described previously) that there is no user entered selection of a stream, a further check is made (at step 134) to see if a record exists of the channel stream selected at the time that the identified disc was last in use. If such a record is held, the stream selected (at step 136) for patching is that which was last in use. In the event that there is neither user input of a stream selection, nor a record of the previous selection for that disc, then a default stream selection is made at step 138. Selection may depend on the form of the identifier (for example, with an alphanumeric identifier, the default selection may be that closest in sequence to "1" or "A") or one of the streams itself may carry an additional code or specific header-bit setting marking it out from the other streams as the default stream.

During the patching operation, the system monitors for user inputs or system signals indicating a change of stream (step 140) or stopping playing (step 142) is to occur. The reception of a user input to change stream at step 140 causes the patching step 132 to update the identifier to be overwritten by the patching identifier, with the transition occurring at the next suitable point (such as the next frame sync). The test for a "stop play" command is looped back to the change of stream test (step 140), suitably via a short delay 144. When the stop command is received, immediately prior to ending play (parking the read head etc.), the currently selected stream identifier is stored with the disc identifier IDD for reference by step 134 when the particular disc is next loaded. With the table of stream identifiers stored as described above, the current stream selection may be stored as a single bit per entry in the table.

In summary, we have described a method and apparatus for demultiplexing selected components (especially audio signals) from a multiplexed data stream. Each of the desired channel components has a unique identification code detected by a processor parsing the contents of a received data buffer between the disc reader and the demultiplexer. The demultiplexer is set up to output received data channel streams having a specific identification code different from any of those assigned to the channel streams originally. Prior to demultiplexing, the identification code for a desired one of the channel streams is altered by the processor to the specific identification code as it passes through the buffer in order to avoid re-setting the demultiplexer.

From reading the present disclosure, other modifications will be apparent to persons skilled in the art. Such modifications may involve other features which are already known in the field of signal processing instruments and apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A signal processing apparatus operable to receive a data signal comprised of a multiplexed plurality of component streams each having a unique identification code as a part thereof, the apparatus including a demultiplexer operable to receive such a data signal from a signal source, together with an input identification code, to demultiplex the signal, and to output the component stream thereof whose identification code corresponds to the input identification code; characterised by patching means in line between the signal source and demultiplexer, the patching means being arranged to change the identification code of a selected component stream within the data signal to a further identification code, and the demultiplexer input identification code is said further identification code.

2. Apparatus as claimed in claim 1, wherein said patching means comprises a memory and coupled processor, the memory being arranged to receive said data signal and said processor being arranged to parse the contents of the memory, identifying the locations of the component stream identification codes, and overwrite a selected one of the component stream identification codes with said further identification code.

3. Apparatus as claimed in claim 2, wherein the signal source comprises a removable storage device and the apparatus further comprises means operable to access data therefrom.

4. Apparatus as claimed in claim 3, wherein said storage device holds data defining an identifier for that device, said means operable to access data being operable to read said device identifier, and said apparatus further comprising non-volatile storage means coupled to receive and store said device identifier with a list of component stream identifiers carried by said device.

5. Apparatus as claimed in claim 4, wherein said non-volatile storage means is further arranged, when reading of data from said removable storage device is stopped, to store with said list of component stream identifiers an indication of the last selected component stream identifier.

6. Apparatus as claimed in claim 1, wherein said data signal is transmitted from a remote location and said signal source comprises a receiver coupled with said apparatus and arranged to receive said transmissions.

7. Apparatus as claimed in claim 1, wherein the data of said data signal is encoded according to a predetermined coding scheme, the apparatus further comprising a decoder stage arranged to receive and decode the component stream output by the demultiplexer.

8. Apparatus as claimed in claim 1, wherein the data signal from the signal source comprises groups of data packets, each group comprises one data packet per component stream in a predetermined arrangement, and each packet includes a packet header containing the respective identification code, with the patching means being arranged to identify packet headers for a selected component stream.

9. Apparatus as claimed in claim 8, wherein all data packets contain a common number of bits, and the patching means is configured to identify packet headers by detecting the start of a group and counting the following bits.

10. A signal processing apparatus as claimed in claim 3, wherein said removable storage device has a first portion carrying data defining an application program and a further portion carrying data defining said multiplexed plurality of component streams; said application program when loaded directing said processor to parse said memory contents to identify said component stream identification codes, and to overwrite a selected one of said component stream identification codes with said further identification code.

11. A signal processing apparatus as claimed in claim 10, wherein said first portion also carries a table of said component stream identification codes appearing in the data carried in the said further portion.

12. A signal processing apparatus as claimed in claim 11, wherein said table includes an indication against one of said component stream identification codes that said code is a default selection, said application program directing said processor to overwrite the default selection component stream identification code with said further identification code in the absence of a contrary component stream selection.

13. A signal processing apparatus as claimed in claim 10, wherein said first portion also carries said further identification code and said application program directs said processor to supply said further identification code to the demultiplexer as the demultiplexer input identification code.

14. A signal processing apparatus as claimed in claim 10, wherein said removable storage device is an optical disc and said first portion is the first track thereof.

15. A method of processing a multiplexed data signal received from a data signal source so as to separate a desired one of a plurality of component data streams which are multiplexed in said data signal, each component data stream having a respective identification code as a part thereof; said method comprising the steps of:

(i) replacing the identification code of a selected one of the component data streams with a further identification code which differs from the identification codes of all of the component data streams;

(ii) demultiplexing the data signal to separate the component data streams therein, and output the component data stream having said further identification code;

(iii) maintaining a stored record of the latest component data stream selection against data signal source identification;

(iv) checking said record for data signal source identification on newly establishing contact with a signal source; and (v) if a record is found to exist of said newly established signal source, initially using the latest component data stream selection in said record as the selected component data stream.

* * * * *